Oct. 1, 1946.  E. F. KING  2,408,401
VEHICLE TRAILER
Filed April 7, 1941  5 Sheets-Sheet 1

INVENTOR.
Edward F. King
BY Spencer, Marzall, Johnston & Cook
Attys.

Oct. 1, 1946.  E. F. KING  2,408,401
VEHICLE TRAILER
Filed April 7, 1941  5 Sheets-Sheet 2

INVENTOR.
Edward F. King
BY Spencer, Marzall, Johnston & Cook
Attys.

Patented Oct. 1, 1946

2,408,401

UNITED STATES PATENT OFFICE 2,408,401

VEHICLE TRAILER

Edward F. King, Oak Park, Ill., assignor of one-half to Richard C. Helders, Chicago, Ill.

Application April 7, 1941, Serial No. 387,196

11 Claims. (Cl. 280—1)

This invention relates to trailers and more particularly to a vehicle drawn trailer providing for the transportation of heavy pieces of machinery such as steam shovels, cranes, large tractors and the like.

A primary object is to simplify the moving of heavy pieces of machinery or the like by the provision of a vehicle drawn trailer that is relatively simple in construction and operation, that is operable on public highways, that is rapidly and easily loaded and unloaded and provides for fast and safe transportation of the machinery from one point to another.

A further object is the provision of such trailer in which the loading and unloading of heavy pieces of machinery or the like is greatly facilitated and readily accomplished in a relatively rapid and safe manner.

A further object is the provision of such trailer in which the rear wheels of the trailer body are readily and quickly detachable from the trailer body to facilitate loading and unloading of the trailer.

A further object is the provision of such trailer in which the rear wheels of the trailer body are readily and quickly detachable from the trailer and movable as a unit to a remote and out of the way position with respect to the rear end of the trailer body.

A further object is the provision of a trailer having a truck portion for mounting a plurality of wheels at the rear end of the trailer and providing for ready detachment of the truck from the trailer to permit separation of the wheels as a unit from the rear end of the trailer body.

Another object is the provision of a trailer in which the rear end of the trailer body may be quickly and easily lowered and raised with respect to the rear supporting wheels of the trailer to facilitate the loading and unloading of the trailer.

A further object is the provision of such trailer in which the rear end of the trailer body may be rapidly, easily, and safely lowered and raised with a heavy piece of machinery supported on the trailer.

A further object is the provision of a trailer having rear wheels readily detachable as a unit and providing for lowering and raising the rear end of the trailer body to facilitate loading and unloading, the mechanism for lowering and raising the end of the trailer body being carried by the rear wheels of the trailer and detachable from the trailer therewith.

A further object is the provision of a trailer having simple and easily operable power mechanism for lowering and raising the rear end of the trailer with respect to the rear supporting wheels of the trailer.

A further object is the provision of a trailer having power mechanism for lowering and raising the rear end of the trailer associated with the rear wheels thereof, and having relatively simple means for locking the trailer in a raised position.

These and other objects will be apparent from the following description, the appended claims, and the accompanying drawings in which:

Referring to the drawings which illustrate a preferred embodiment of the invention and in which like reference numerals designate like parts in the several views, there is shown a motor driven trailer indicated generally by the reference numeral 10 comprising a motor driven vehicle 11, a trailer 12, and a truck assembly 13, having wheels 14 mounted therein for normally supporting the rear end of the trailer 12 in a raised position above the ground. The motor vehicle 11 may be of any suitable type having a portion 15 adapted to engage under a nose piece 16 provided on the front end of the trailer 12 to support the forward end of the trailer in a raised position above the ground. A suitable connection, not shown, is also provided between the nose member 16 and the motor vehicle 11 to provide for pulling the trailer upon operation of the motor vehicle.

Figure 2:
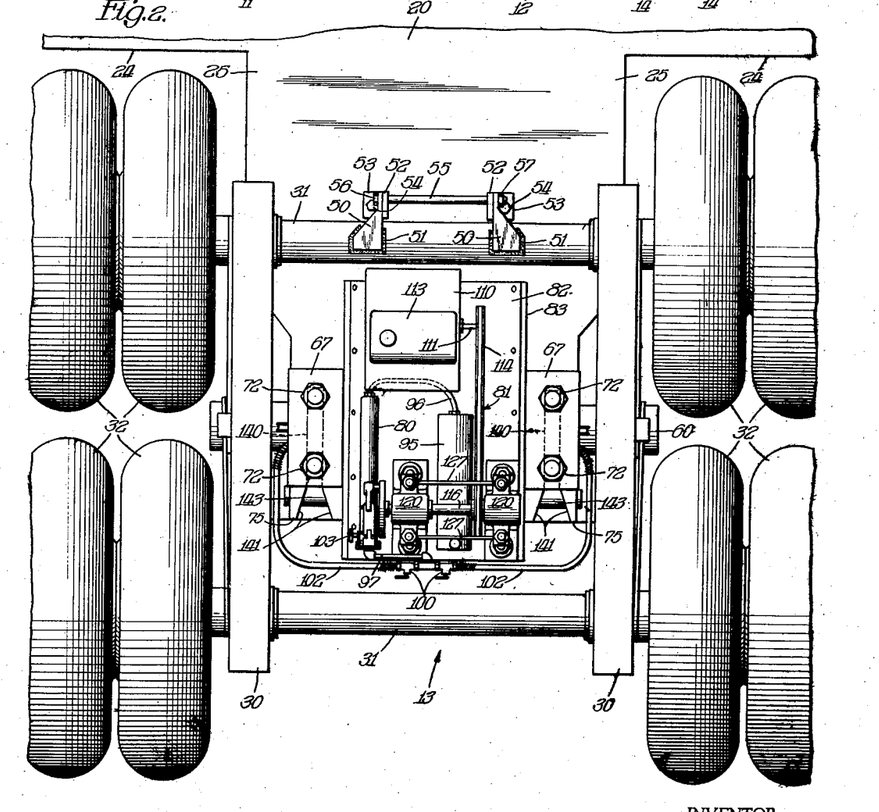
Fig. 2 is a part plan view showing the construction at the rear end of the trailer body.
Figure 3:
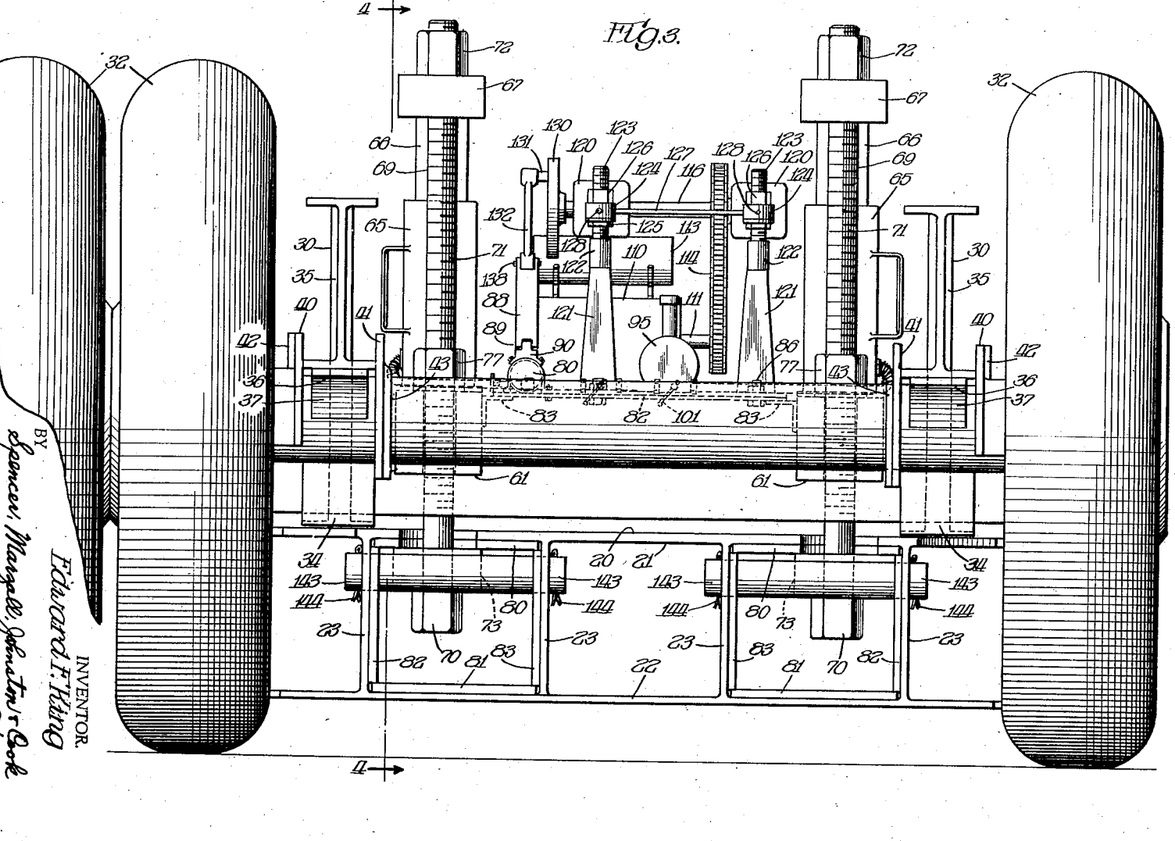
Fig. 3 is an end elevation taken at the rear end of the trailer.

The trailer 12 comprises a relatively wide and substantially flat body portion 20 that is adapted to receive a heavy piece of machinery or the like and support the same above the ground for rapid and safe transportation from one point to another. As best shown in Fig. 3, the body portion 20 comprises a heavy platform or frame member made up of upper and lower plates 21 and 22 and a plurality of reinforcing or stiffening ribs or channel members 23 that extend longitudinally of the platform at spaced points across the width thereof and are integrally connected to the plates 21 and 22 to provide a very strong, rigid and unitary structure adapted to receive and support very heavy and large pieces of machinery thereon. The body portion 20 is cut away just forwardly of the rear wheels 14 of the trailer as indicated at 24 in Fig. 2 to provide a portion 25 of reduced width which extends a substantial distance rearwardly between the wheels on the opposite sides of the trailer.

The truck assembly 13 which provides for normally supporting the rear end of the trailer body and the machinery carried thereon in a raised position above the ground comprises two longitudinally extending frame members 30 positioned at opposite sides of the trailer and providing for supporting the axles 31 of the rear wheels 14. In the illustrated embodiment two longitudinally displaced axles 31 are disclosed and 8 wheels are provided in the truck assembly 13. The wheels 14 are provided with pneumatic tires 32 and are rotatably mounted on the axles 31. To provide for reinforcing and strengthening the frame members 30 the width or depth of the frame members in a vertical plane is substantially increased intermediate the two axles as indicated by the downwardly extending portions 33 and 34 in Figs. 4 and 5. The thickness of the frame members is also increased intermediate the axles as indicated at 35 in Figs. 3, 4, and 5.

Figure 4:
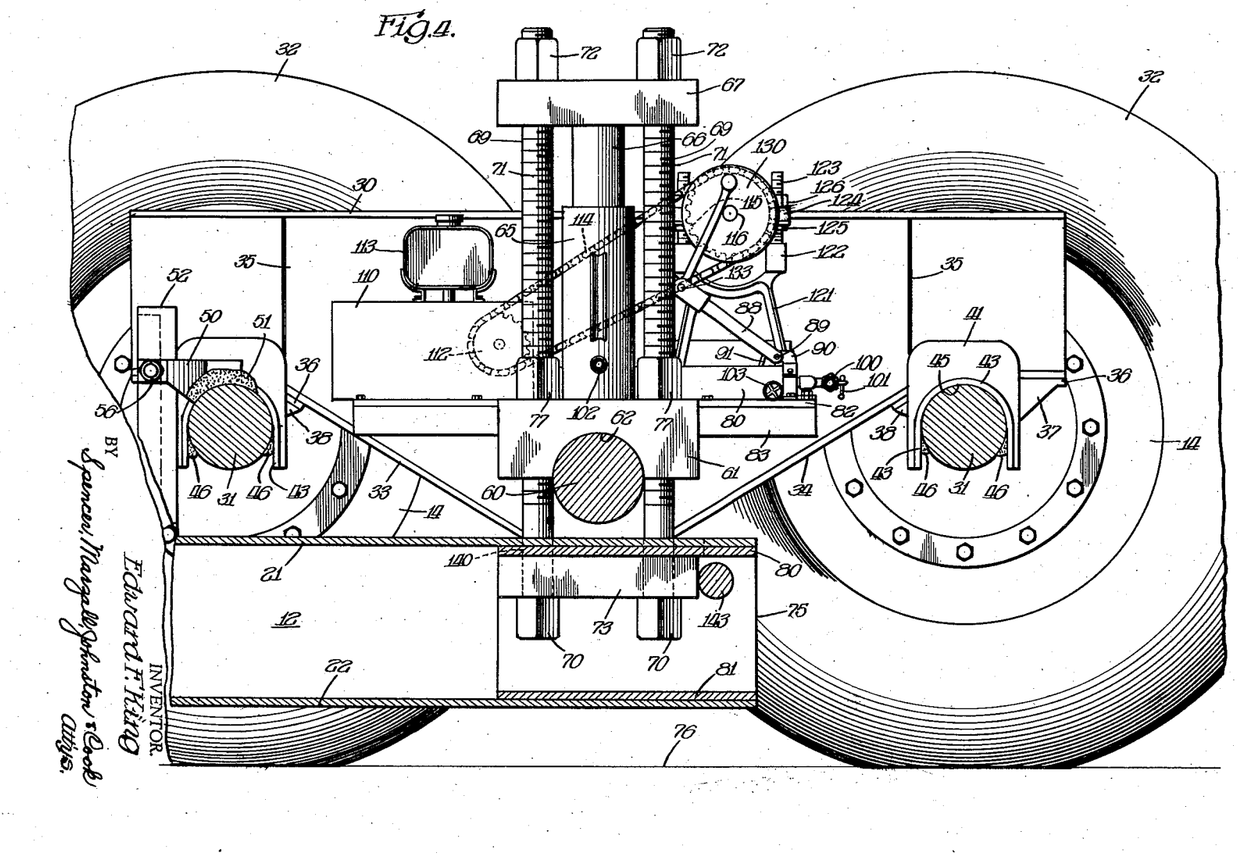
Fig. 4 is a sectional view taken on the line 4—4 of Fig. 3 and showing the construction at the rear end of the trailer in greater detail.
Figure 5:
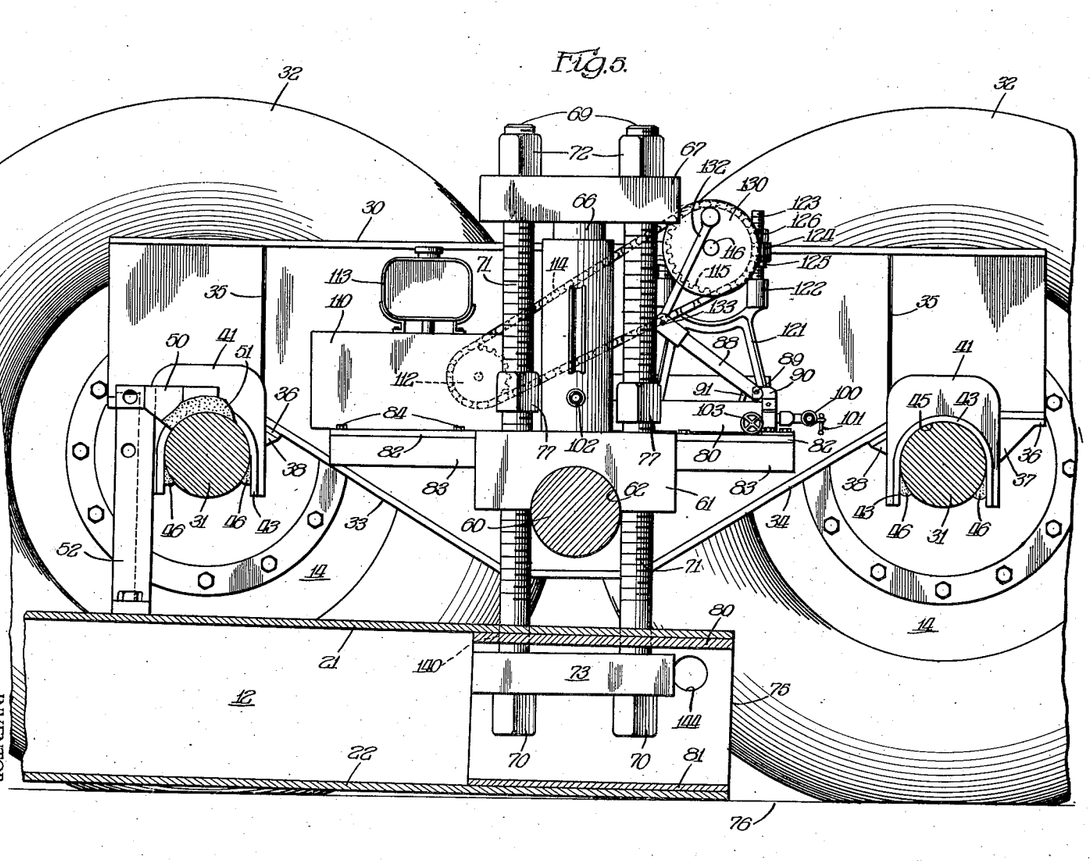
Fig. 5 is a view similar to Fig. 4 but showing the trailer parts in a different operative position.
Figure 6:
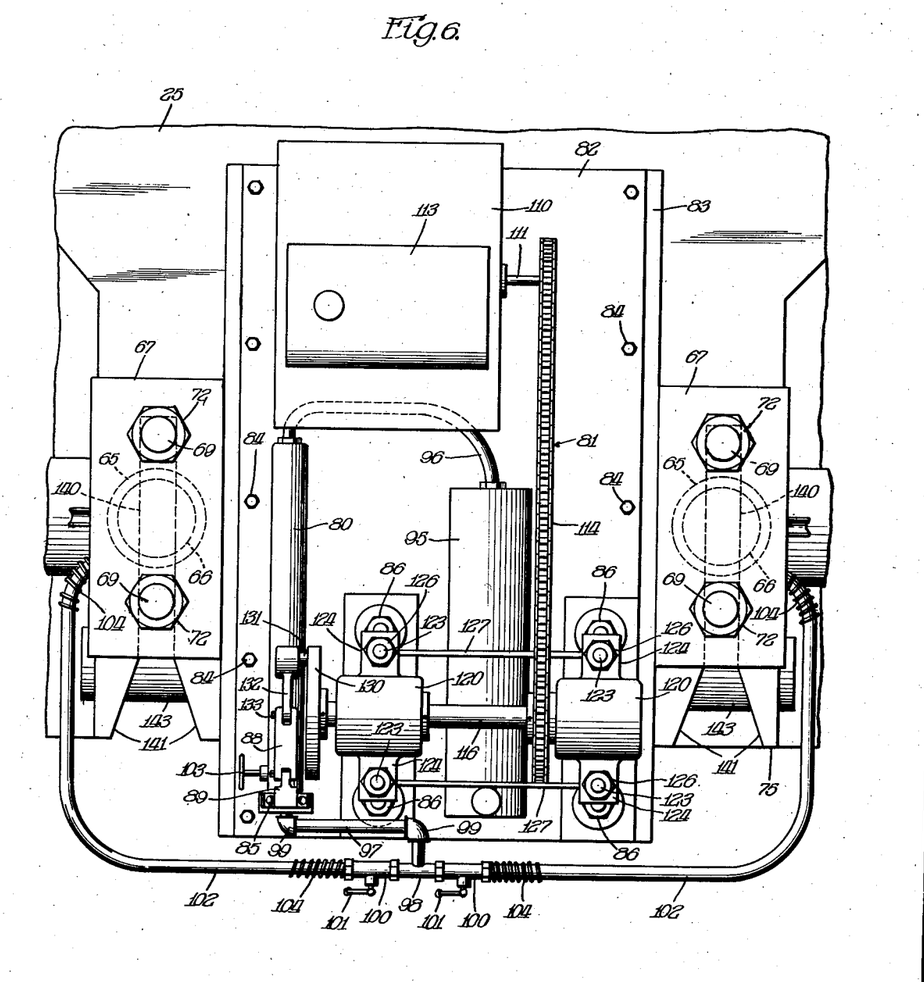
Fig. 6 is an enlarged plan view of a portion of the mechanism shown in Fig. 2.

A plate 36 is welded to the bottom of each of the frame members 30 at each end thereof and provided with downwardly extending portions 37 and 38 (see Figs. 4 and 5) which provide a seat or socket which engages around the axles 31 and maintains the two axles in fixed longitudinal position with respect to the frame members 30. To provide for maintaining the frame members 30 in proper spaced positioning longitudinally of the axles 31 a plurality of transverse plates 40 and 41 having strengthening ribs 42 and 43 are welded to the axles 31 at opposite sides of each of the end frames 30 and provide stops preventing lateral movement of the frame members on the axles. The transverse members 40 and 41 are slotted as indicated in Figs. 4 and 5 to provide a seat 45 which fits over and rests upon the axle and the plates are then welded to the axles as indicated at 46 in these figures.

A means is also provided for preventing twisting of the forward axle 31 about its longitudinal axis. Referring to Figs. 2, 4, and 5 a pair of spaced forwardly extending plate members 50 are welded to the forward axle 31 as indicated at 51. A pair of vertical plates 52 are attached to the top plate 21 of the trailer body 20 and extend upwardly adjacent the inner vertical faces of the forwardly extending members 50. The plates 52 are provided with out-turned legs 53 which are secured to the trailer member 21 by suitable means such as bolts 54. A rod 55 in the form of a bolt having a head 56 and a nut 57 extends through each of the members 50 and associated plates 52 and locks the plate members 50 to the upwardly extending plates 52. The plate members 50 are thus locked against turning movement about the axis of the axle 31 and thereby prevent twisting of the axle.

In order to facilitate loading and unloading of the trailer and to provide for loading and unloading in a rapid, easy and safe manner, the rear end of the body member 20 of the trailer 12 is adapted to be lowered and raised with respect to the truck assembly 13 and the ground, and the truck 13 is adapted to be removed as a unit from the trailer body when the rear end is in the lowered position in which it is in contact with the ground.

The means for effecting lowering and raising of the rear end of the trailer is carried by the truck assembly 13 and is removable from the trailer body therewith when the trailer body is lowered and rests upon the ground. Referring to the drawings this means comprises a rod 60 which extends transversely of the truck assembly intermediate the axles 31 and is rigidly supported adjacent its ends in the downwardly extending portion of the frame members 30. A supporting block 61 is mounted on the transverse rod 60 adjacent but inwardly of each of the frame members 30. As shown in Figs. 4 and 5 the supporting blocks 61 are provided with seat portions 62 which engage over the rod 60 and provide for supporting the blocks on the rod. The blocks 61 extend transversely outwardly from the opposite sides of the rod 60 and are securely fastened to the rod 60 by suitable means such as welding or the like.

A hydraulic jack 65 which may be of any suitable construction is mounted upon each of the supporting blocks 61 directly above the transverse rod 60 and is provided with a plunger 66 that is adapted to extend vertically upwardly out of the top of the jack 65. A crosshead 67 is attached to the upper end of the jack plunger 66 and provides for supporting and moving a pair of vertically extending operating rods 69 in accordance with movement of the jack plunger. The operating rods 69 are in the form of large elongated bolts having heads 70 at the lower ends thereof and provided with a threaded portion 71 for a substantial portion of the length thereof. The rods or bolts 69 extend upwardly through suitable holes in crosshead 67 and are supported on the crosshead by nuts 72 which are threaded on the upper ends of the rods and engage the upper surface of the crosshead 67. The rods 69 extend downwardly on opposite sides of the transverse member 60 through suitable openings provided in the supporting member 61 and at the lower ends pass through a lifting head 73 that extends longitudinally of the truck assembly and trailer and is supported by the head 70 of the rods 69.

The lifting heads 73 at each side of the truck assembly are adapted to engage under the top plate 21 of the trailer body member as clearly shown in Figs. 3, 4, and 5 and provide for lifting and lowering the rear end 75 of the trailer body in accordance with movement of the jack plunger 66. Thus in Fig. 4 of the jack plunger 66 is shown in its upward or lifted position and the ends 75 of the trailer body are shown as being supported in a raised clearance position with respect to the ground indicated by the line 76. In Fig. 5 the parts are shown with the jack 65 in its lowered position. In this position the jack plunger 66 has receded downwardly into the body portion of the jack 65 and the rear end 75 of the trailer body has been lowered into a position in which the bottom plate 22 of the trailer body rests upon the ground as indicated by the line 76. To provide for ready detachment of the truck assembly 13 together with the lifting and lowering mechanism carried thereby in a manner to be hereinafter more fully described, the lifting heads 73 are not fixedly attached to the body of the trailer member and the movement of the jack plunger 66 is such that when the jack has been operated to its lowered position, as illustrated in Fig. 5, with the rear end of the trailer body resting on the ground the lifting head 73 will be displaced below the upper plate member 21 of the trailer body and out of contact therewith as clearly indicated in Fig. 5. To provide for reinforcing and strengthening the body member at the portions thereof which are engaged by the lifting heads 73 a plurality of plates 80, 81, 82, and 83 are provided on the inner faces of the upper and lower plate members 21 and 22 and rib members 23 respectively, as shown in Figs. 3, 4, and 5, and are welded or otherwise rigidly attached to the various plate and rib members. The lifting head 73 when in the lowered position shown in Fig. 5 is also spaced below and out of engagement with the reinforcing plate 80 as clearly shown in this figure.

It will be evident from the foregoing description that the hydraulic jack 65 and its associated operating mechanism provide for lowering and raising the rear end of the trailer body with respect to the truck assembly 13 and the ground line 76. Thus with the parts in the position illustrated in Fig. 5 in which the jack plunger 66 is lowered within the jack 65 and the rear end of the trailer body rests upon the ground, the jack can be operated to effect lifting of the plunger 66 upwardly out of the body portion of the jack 65. This upward movement of the plunger 66 is transmitted to the lifting head 73 by means of the crosshead 67 and the operating rods 69 and causes the lifting head to engage under the upper plate 21 and reinforcing plate 80 of the trailer body and to effect lifting of the rear end of the trailer body upon continued upward movement of the jack plunger 66 until the rear end of the trailer body has been raised to a substantial clearance distance above the ground line 76 as shown in Fig. 4. Upon operation of the jack 65 to lower the plunger 66 into the body portion of the jack the movement is in the opposite direction and the rear end of the trailer body is moved downwardly until it engages the ground.

A manually operable means independent of the hydraulic jack is also provided to lock the lifting mechanism in its upward or raised position to insure that the rear end of the trailer will be maintained in a clearance position above the ground until it is desired to again lower this end of the trailer for loading or unloading purposes. As shown in Figs. 4 and 5 this means comprises a nut 77 that is provided on the vertical rods 69 above the supporting member 61 and has threaded engagement with the threaded portion 71 of the rods. Thus when the lifting mechanism has been operated to its upper or raised position as shown in Fig. 4 the nuts 77 may be manually turned on the threaded portions 71 of rods 69 to cause the locking nuts to engage the upper surface of the supporting blocks 61 and thereby lock the rods 69 in the raised position. When it is desired to lower the rear end of the trailer body the nuts 77 are turned on the threaded portion 71 of the rods 69 to cause the locking nuts to move upwardly on the rods out of engagement with the supporting blocks 61 and thereby permit downward movement of the rods to lower the rear end of the trailer as is clearly illustrated in Fig. 5 of the drawings.

To provide for operation of the hydraulic jack 65 a pump 80 and a power drive means for operating the pump indicated generally by the numeral 81, are carried by the truck assembly 13 and supported upon a platform or plate member 82. The plate member 82 is supported by an angle iron 83 which is attached to the inner face of each of the supporting blocks 61 as shown in Figs. 3 to 6 and to which the platform or plate member 82 is rigidly connected by bolts 84. The pump 80 and the power drive means 81 are securely attached to the plate member 82 by any suitable means such as bolts 85 and 86.

The pump 80 may be of any suitable construction providing for pumping fluid under pressure into the hydraulic jacks 65 to effect upward movement of the plunger 66 thereof and permitting return of the fluid through the pump to effect lowering of the jack plunger 66. In the illustrated embodiment the pump is shown as provided with an arm 88 pivotally connected as indicated at 89 to a fixed lug 90 provided on the pump and which is adapted to be swung upwardly and downwardly about the pivot 89 by the power drive mechanism for the pump. A link 91 connects the arm 88 with the operating mechanism within the pump 80 and provides for operating the pump in response to the up and down movement of the arm 88 about its pivot 89.

The pump 80 is adapted to receive a suitable hydraulic operating fluid such as oil from a reservoir or storage tank 95 mounted on the platform 82 and connected to the intake side of the pump by a pipe 96. A pipe 97 is connected to the pump outlet and to a T coupling 98 by suitable elbows 99. A pair of valve members 100 having operating handles 101 are connected to opposite legs of the coupling 98 and a flexible hose 102 connects each of the valve members 100 to one of the hydraulic jacks 65. Coiled springs 104 surround the hose members 102 at the junction with the coupling 98 and the hydraulic jacks 65 to reinforce and stiffen the flexible hose members at these points. The pump 80 is also provided with a cut off valve 103 at the outlet side of the pump.

The power drive mechanism 81 for the pump 80 comprises a small gasoline engine that is enclosed within a housing 110 and is provided with a drive shaft 111 that extends outwardly from the housing 110 and has a sprocket 112 attached to the outer end thereof. A fuel tank 113 is mounted on top of the engine housing 110 and provides for supplying fuel to the engine enclosed within the housing. A chain 114 engages around the sprocket 112 and also a second sprocket 115 attached to a shaft 116 at the rear end of the platform 82.

The shaft 116 is rotatably mounted in bearings 120 which are adjustably supported at a substantial distance above the platform 82 by the frame members 121. The frame members 121 are attached to the platform 82 by the bolts 86 and are provided at their upper ends with a pair of socket members 122 positioned adjacent opposite sides of the bearings 120 and providing seats into which upwardly extending studs 123 are threaded. Each of the bearings 120 has laterally extending ears 124 which are rigidly attached to the opposite sides thereof and are provided with suitable openings adapted to slidably receive the upwardly extending studs 123. Nuts 125 and 126 which have threaded engagement with the studs 123 are provided below and above each of the ear members 124 of the bearings and provide for supporting and locking the ear members 124 in a desired adjusted positioning. Thus by loosening the upper nuts 126 and turning the lower nuts 125 the height of the ear members 124 and bearings 120 above the platform 82 can be varied and upon tightening of the upper nuts 126 the ears and bearings are locked in the adjusted position. A pair of tie rods 127 extend between the ears 124 of the two bearings 120 and provide for maintaining both bearings at the same height above the platform upon adjustment of the position of the bearings. Set screws 128 are also provided in the ear members 124 and assist in holding the ear members in proper adjusted position on the studs 123.

A disc 130 provided with an eccentrically arranged crank pin 131 is attached to one end of the shaft 116 outwardly of the frame member 121 and adjacent to the vertical plane of movement of the arm 88 of pump 80. A linkage arm 132 is pivotally connected to the crank pin 131 at its upper end and has a pivotal connection at its lower end with the arm 88 as indicated at 133. Thus upon operation of the engine within housing 110 the shaft 116 is caused to effect rotation of the eccentrically arranged crank pin 131 about the axis of the shaft 116. This motion of the crank pin is transmitted to the arm 88 by means of the linkage arm 132 and causes the arm 88 to swing upwardly and downwardly about its pivot 89 through a predetermined arc of movement and thus operate the pump 80 as hereinabove described.

As described above the truck assembly 13 is detachable from the trailer 12 when the rear end of the trailer body has been lowered to rest upon the ground to thereby provide for moving the entire truck assembly including the lifting mechanism and power drive means therefor carried by the assembly to a remote position with respect to the trailer body. The means for normally connecting the truck assembly to the trailer and also providing for ready detachment of the truck assembly from the trailer comprises a pair of longitudinally extending slots 140 provided in the upper plate 21 of the trailer body adjacent the opposite sides thereof and adapted to slidingly receive the vertical lifting rods 69 therein. The slots 140 open outwardly at the rear end 75 of the plate 21 and are provided with outwardly flaring portions at the outer ends thereof as indicated at 141 in Figs. 2 and 6 to assist in guiding the lifting rod 69 into the slots when the truck assembly is reconnected to the trailer after a loading or unloading operation. The truck assembly is normally connected to the trailer by a pair of locking bars 143 which extend through suitable openings 144 (see Fig. 5) provided in the rib members 23 and reinforcing plates 82 and 83 just rearwardly of the rearmost rod 69 when the rods are received in the slots 140. The locking bars thus provide for normally maintaining the rods 69 in the slots 140 and thereby normally lock the truck assembly to the trailer. When the rear end of the trailer body has been lowered to rest on the ground, however, the locking bars 143 may be readily removed and the truck assembly readily detached from the trailer by merely moving the assembly rearwardly on its wheels 14, the lifting rods 69 sliding out of the open rear ends of the slots 140. As described above the lifting head 73 in the lowered position of the lifting mechanism is spaced below and detached from the plate 21 and reinforcing plate 80 of the trailer body, as shown in Fig. 5, and permits the rods 69 to slide into and out of the slots 140. When it is desired to again connect the truck assembly to the trailer the truck is merely moved forward on its wheels to cause the lifting rods 69 to enter and slide into the slots 140 with the lifting heads 73 received under the trailer body plate 21 and reinforcing plate 80 as shown in Fig. 5. The locking bars 143 are then replaced and the parts are attached and ready for raising the rear end of the trailer to a clearance position above the ground by the lifting mechanism of the truck assembly. Readily removable cotter pins 144 or the like normally extend through the ends of the locking bars 143 to maintain the bars in proper locking position.

Figure 1:
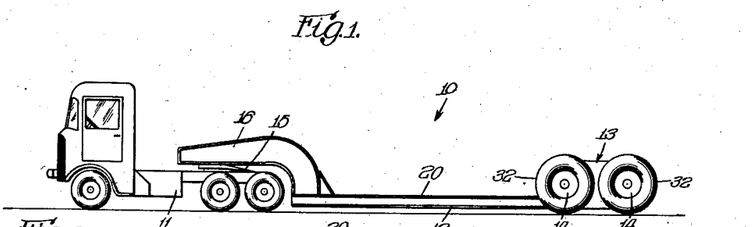
Fig. 1 is a side elevation of the complete vehicle driven trailer.

The operation of the trailer will be evident from the above description. Assuming the various parts to be in the connected condition shown in Fig. 1 and that it is desired to either load or unload the trailer, the rod 55 in the forward end of the truck assembly is first removed to permit the vertical plates 52 to move downwardly with respect to the plate members 50 when the rear end of the trailer body is lowered. The locking nuts 77 are then moved upwardly on the threaded portions 71 of the lifting rods 69 to disengage the nuts from the supporting member 61 and provide for downward movement of the rods 69 through the openings provided in supporting member 61. With the rear end of the trailer in its normal raised position, shown in Fig. 4, the hose valves 100 and the pump valve 103 are closed to hold a quantity of the operating fluid in the hydraulic jacks 65 and maintain the plunger 66 in its raised position. These valves are now opened to permit the fluid contained in the hydraulic jacks to flow back into the storage tank 95 through the hose members 102, coupling 98, pipe 97 and pump 80. The weight of the trailer body and the lifting mechanism is such that the plunger moves downwardly into the hydraulic jack 65 under the action of gravity and forces the fluid contained in the jacks back into the storage tank as above described. This downward movement of the parts, however, is not sudden but is controlled by the rapidity with which the hydraulic fluid can be forced through the hose connections, valves, and the like. The end of the trailer body thus moves downwardly at an even and controlled rate and there is no jarring of the trailer or the lifting mechanism when the end of the trailer body engages the ground.

The locking bars 143 are then removed, after first removing the cotter pins at one end of the bars, to detach the truck assembly from the trailer and the entire truck assembly can be moved rearwardly on its wheels to entirely disengage it from the trailer body. After disengagement from the trailer the truck assembly can be moved to any desired remote point with respect to the rear end of the trailer where it is out of the way and does not interfere with loading or unloading the trailer at the lowered rear end thereof. After the truck assembly has been separated and removed from the rear end of the trailer, suitable planking or the like which may be carried by the trailer is laid at the rear end of the trailer to provide a gradual incline from the upper body plate 21 to the ground. The crane, shovel, tractor, or other piece of machinery is then loaded or unloaded by running it over this gradual incline at the rear end of the trailer.

After the trailer has been thus loaded or unloaded the truck assembly can be rolled on its wheels back into proper position at the rear end of the trailer for the lifting rods 69 to enter into the slots 140 of the trailer body. The truck is then moved forward to cause the lifting rods to be received within the slots and the locking bars 143 are replaced to again connect the truck assembly to the trailer body.

The rear end of the trailer body can now be raised to a clearance position above the ground by first starting the gasoline engine enclosed within the housing 110 to effect operation of the pump 80 and then opening valves 100 and 103 to provide for pumping hydraulic fluid into the hydraulic jacks 65 under pressure. The hydraulic jacks under operation of the pump 80 cause the jack plungers 66 to move upwardly out of the body portions of the jacks and thereby effect raising of the rear end of the trailer body through the lifting rods 69 and lifting heads 73. When the jack plungers have reached the upper-most position the valves 100 and 103 are closed and the gasoline engine for driving the pump 80 may be stopped. Closing of the valves 100 and 103 traps the hydraulic fluid that has been pumped into the jacks 65 therein and maintains the plungers 66 in the raised position. The valves 100 and 103 are maintained closed until it is desired to again lower the rear end of the trailer for loading or unloading purposes. Rod 55 can now be replaced in the members 50 and 52, and the locking nuts 77 can be screwed down into engagement with the top of the supporting member 61 to positively lock the lifting mechanism in its raised position.

A vehicle driven trailer is thus provided that has great utility in the rapid and safe transportation of heavy pieces of machinery from one point to another, which greatly facilitates the loading and unloading of the trailer, and provides for loading and unloading in a rapid, simple and safe manner. The truck assembly which normally supports the rear end of the trailer comprises a rigid unitary structure that is readily detachable from the trailer as a single unit. The lifting mechanism and the power drive for the lifting mechanism are all supported on the rear truck assembly for detachment and removal from the truck with the truck assembly.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a trailer of the character described adapted for moving heavy machinery and the like, a trailer body adapted to be connected to a motor vehicle at its forward end, means including a removable wheel assembly for normally supporting the rear end of said trailer body in a raised position above the ground, and means including a power drive means carried by said wheel assembly and removable therewith for lowering said rear end of the body into supporting engagement with respect to the ground and lifting said end from said lowered position to said raised position.

2. In a trailer of the character described adapted for moving heavy machinery and the like, a trailer body adapted to be connected to a motor vehicle at its forward end, a removable wheel assembly for normally supporting the rear end of said trailer body in a raised position above the ground, and lifting and lowering means carried by said removable wheel assembly for lowering and lifting said rear end of the trailer body between said raised position and a lowered position in which the end is supported from the ground, said lifting and lowering means including a vertically movable rod detachably receivable in a rearwardly opening slot provided in a portion of said trailer body.

3. In a trailer of the character described adapted for moving heavy machinery and the like, a trailer body adapted to be connected to a motor vehicle at its forward end, a removable wheel assembly for normally supporting the rear end of said trailer body in a raised position above the ground, and means providing for lowering and raising said rear end of the trailer body with respect to said supporting means, said last named means including a vertically movable rod and a rearwardly opening slot for receiving said rod.

4. In a trailer of the character described adapted for moving heavy machinery and the like, a trailer body adapted to be connected to a motor vehicle at its forward end, a removable unitary wheel assembly for normally supporting the entire rear end of said trailer body in a raised position above the ground, and means carried by said removable wheel assembly for lifting and lowering said rear end of the trailer body, said lifting and lowering means including a pair of hydraulic jacks mounted on opposite sides of said wheel assembly, pump means mounted on said wheel assembly, means providing valved connections between said pump means and said hydraulic jacks, power means on said wheel assembly for driving said pump means, and means providing a detachable connection between said hydraulic jacks and said trailer body.

5. In a trailer of the character described adapted for moving heavy machinery and the like, a trailer body adapted to be connected to a motor vehicle at its forward end, a removable wheel assembly for normally supporting the rear end of said trailer body in a raised position above the ground, lifting and lowering mechanism for the rear end of the trailer body carried by said wheel assembly and removable therewith, and means for disconnecting said wheel assembly from the trailer body upon lowering of said rear end, said lifting and lowering mechanism comprising a supporting member mounted on said wheel assembly, a hydraulic jack mounted on said supporting member, a jack operated rod extending downwardly through said supporting member for attachment with said trailer body, said rod being movable upwardly and downwardly under action of said jack to effect lifting and lowering of said rear end of the trailer body with respect to the ground, and means providing a detachable connection between the lower end of said rod and said trailer body.

6. In a trailer of the character described adapted for moving heavy machinery and the like, a trailer body adapted to be connected to a motor vehicle at its forward end, a unitary truck assembly having a plurality of wheels mounted therein for normally supporting the rear end of said trailer body in a raised position above the ground, a supporting member mounted on said truck assembly, a hydraulic jack mounted on said supporting member, a jack operated rod extending downwardly through said supporting member for attachment with said trailer body, said rod being movable upwardly and downwardly under action of said jack to effect lowering and lifting of said rear end of the trailer body with respect to the ground, and means cooperating with said rod and said supporting member for normally locking said rod in a raised position.

7. In a trailer of the character described adapted for moving heavy machinery and the like, a trailer body adapted to be connected to a motor vehicle at its forward end, a unitary truck assembly having a plurality of wheels mounted therein for normally supporting the rear end of said trailer body in a raised position above the ground, a supporting member mounted on said truck assembly, a hydraulic jack mounted on said supporting member, a jack operated rod extending downwardly through said supporting member for attachment with said trailer body, said rod being movable upwardly and downwardly under action of said jack to effect lowering and lifting of said rear end of the trailer body with respect to the ground, the portion of said rod that extends above said supporting member being provided with a screw thread, and a nut on said rod adapted to be turned on said thread to engage said supporting member to lock said rod in a raised position.

8. In a trailer of the character described adapted for moving heavy machinery and the like, a trailer body adapted to be connected to a motor vehicle at its forward end, a unitary truck assembly having a plurality of wheels mounted therein for normally supporting the rear end of said trailer body in a raised position above the ground, means for effecting lowering and lifting of said rear end of the trailer body with respect to the ground and providing for detachment of said truck assembly from said trailer body comprising a substantially vertical rod mounted on said truck assembly for up and down movement, means for effecting said up and down movement of said rod, said trailer body being provided with a slot open at the rear end of the body and adapted to receive the lower end of said rod, means on said rod and engageable under a portion of said trailer body for effecting lowering and raising of the rear end of the trailer body in accordance with movement of the rod, said rod becoming displaceable rearwardly through the opening in said slot, and releasable means for normally locking said rod in position in said slot.

9. In a trailer of the character described adapted for moving heavy machinery and the like, a trailer body adapted to be connected to a motor vehicle at its forward end, a unitary truck assembly having a plurality of wheels mounted therein for normally supporting the rear end of said trailer body in a raised position above the ground, means for effecting lowering and lifting of said rear end of the trailer body with respect to the ground and providing for detachment of said truck assembly from said trailer body comprising a plurality of substantially vertical rods positioned adjacent opposite sides of said truck assembly and mounted on the truck assembly for up and down movement, means for effecting controlled up and down movement of said rods, said trailer body being provided with slots open at the rear end of the body and adapted to receive the lower ends of said rods, means on said rods and engageable under a portion of said trailer body for effecting lowering and raising of the rear end of the trailer body in accordance with movement of the rods, said rods being displaceable rearwardly through the opening in said slots, and releasable means for normally locking said rods in position in said slots.

10. In a trailer of the character described adapted for moving heavy machinery and the like, a trailer body adapted to be connected to a motor vehicle at its forward end, a removable wheel assembly for normally supporting the rear end of said trailer body in a raised position above the ground, means providing for lowering and raising said rear end of the trailer body with respect to said supporting means, said last named means including a vertically movable rod and a rearwardly opening slot for receiving said rod, and means cooperating with said rod and slot for removably attaching said wheel assembly to the rear end of said trailer body.

11. In a trailer of the character described adapted for moving heavy machinery and the like, a trailer body adapted to be connected to a motor vehicle at its forward end, a removable wheel assembly for normally supporting the rear end of said trailer body in a raised position above the ground, lifting and lowering means carried by said removable wheel assembly for lowering and lifting said rear end of the trailer body between said raised position and a lowered position in which the end is supported from the ground, said lifting and lowering means including a vertically movable rod detachably receivable in a rearwardly opening slot provided in a portion of said trailer body, and means cooperating with said rod and slot for removably attaching said wheel assembly to the rear end of said trailer body.

EDWARD F. KING.